Patented May 29, 1945

2,377,221

UNITED STATES PATENT OFFICE 2,377,221

STYRENE SEPARATION

Alfred W. Francis, Woodbury, N. J., and Ebenezer E. Reid, Baltimore, Md., assignors to Socony-Vacuum Oil Company, Incorporated, a corporation of New York No Drawing. Application July 7, 1942, Serial No. 450,070

4 Claims. (Cl. 260—669)

This invention relates to the separation of styrene and its homologues from mixtures with ethyl benzene and the like.

Styrene is now being produced by mild cracking of ethyl benzene and is obtained in admixture with unconverted ethyl benzene. Separation of the two compounds is a major problem. Due to the fact that their boiling points are relatively close together, separation by distillation is a slow procedure involving maintenance of styrene at relatively high temperatures for long periods of time. Such distillation is inevitably accompanied by considerable polymerization of styrene thus drastically reducing the yield of the desired monomer.

We have found that concentrated aqueous solutions of silver nitrate and the like in contact with mixtures of ethyl benzene and styrene dissolve the latter selectively, i. e., to the practical exclusion of the former; and that the styrene thus dissolved can be recovered from the silver nitrate solution by re-extraction with a volatile water-immiscible solvent. Solvents suitable for this purpose are pentane, hexane, petroleum ether, chloroform, carbon tetrachloride, etc. A low boiling solvent is preferred, so that it can be distilled off without much heating.

Prior to the present invention, certain inorganic salts in aqueous solution were known to possess the power of dissolving or reacting with olefins to the more or less complete exclusion of paraffins. These compounds are mainly the soluble salts of silver, copper and mercury. The separation of olefins from a mixture of olefins and paraffins can be carried out, for instance, with solutions of mercuric chloride, mercuric nitrate, silver nitrate and cuprous chloride in solution with hydrochloric acid or with ammonia, or with ammonium chloride. Of these various reagents, the mercuric salts seem the least suited to a process where an olefin product is desired, because the reaction between these salts and the olefins is normally irreversible. All of the other salts above indicated, such as the salts of copper and silver, combine reversibly with olefins. Of these, the most effective agent is silver nitrate. Silver nitrate may be used either in acid or a neutral solution. The use of concentrated or saturated neutral aqueous solutions of silver nitrate, is preferred.

There is some uncertainty as to whether the so-called solution of olefins in silver nitrate solutions is a solution without chemical bond or an actual chemical reaction. There are strong points of evidence which would serve to point in either direction. For instance, the action resembles a physical solution in the following respects: the action of solution is quite rapid, all of the olefin dissolved may easily be extracted by purely physical means, as with an organic solvent, and it has been found that the amount of the olefin dissolved is roughly proportional to the pressure. The combination of gaseous olefin and aqueous silver nitrate solution appears to be entirely reversible in the sense that the amount of gas dissolved tends to follow the law of Henry and increases with increases of pressure, and the action may be reversed and the dissolved gas substantially entirely removed by a decrease of pressure to a sufficient extent. In the case of the mercuric salts, for instance, it would be impossible to obtain this reversal of the solution reaction and remove the gases by merely decreasing the pressure. It has been found also that the specific solubility of propylene, for instance, in concentrated silver nitrate, is greater than an equimolecular amount. On the other hand, it has been found, the operation resembles a chemical reaction in that: the concentration of the propylene or other olefin dissolved seems proportional to the amount of silver ion present; the solutions present abnormal characteristics of density; no evolution of gas or formation of liquid droplets occurs upon freezing the solution, and the solvent reagents effective for olefins have very little solvent power for the physically similar paraffins, even when already containing dissolved olefins.

From the above diversity of data, it is difficult to pick an exact term to designate the operation of combining olefins with an aqueous solution of silver nitrate, but with the understanding that the word is used solely in the sense in which it is descriptive of the present operation, this operation will hereinafter be described as solution. The disclosed processes of the prior art furnish a satisfactory means for the solution of olefins in aqueous silver nitrate solution.

This process has been widely applied to the separation of lower olefins from mixtures with paraffin hydrocarbons. The art has believed, and the published data has reflected the belief, that the process is commercially applicable only to the lower olefins, i. e., ethylene, propylene, butylenes and pentenes where high purity is desired. That this belief was fully justified is shown by the following table of solubilities expressed as milliliters of liquid olefin in 100 milliliters of a 70% solution of silver nitrate in water at 25° C. when the solution is saturated with olefin:

| Olefin | Solubility in 70% $AgNO_3$ |
|---|---|
| Propylene | 86 |
| Butene-2 | 14.4 |
| Trimethyl-ethylene | 2.3 |

Obviously, separation of pentenes by this method would involve almost prohibitive expense for most purposes and the process is certainly not feasible for higher olefins. We have found that styrene has a solubility in solutions of silver nitrate and other salts capable of reversibly combining with olefins far in excess of what would be predicted from the above data. The solubility of styrene in 70% aqueous silver nitrate solution at 25° C. is somewhat greater than 6 milliliters per 100 milliliters of aqueous solution.

The present process preferably includes a step of separating the styrene from the silver nitrate solution by extraction of the solution with a water immiscible solvent boiling at a temperature substantially below that of styrene. The lower the boiling point of the water-immiscible solvent, the less will be the chance of polymerization of the styrene. Where very low boiling solvents are used, polymerization may be completely inhibited by addition of a polymerization inhibitor such as is normally added to styrene during storage; for example, hydroquinone. The process is exemplified by the following specific procedure used in a batch process.

A mixture of twenty volumes of ethyl benzene and ten volumes of styrene was extracted in a batch operation by fifty volumes of 70% silver nitrate in water. Three volumes or 30% of the styrene was extracted on one operation. The hydrocarbon layer was separated and twenty-five volumes of n-pentane were added to the aqueous layer. This re-extracted two and one-half volumes or five-sixths of the dissolved styrene. The pentane solution was evaporated at low temperature leaving the dissolved styrene, which was shown by bromine titration to be substantially pure. Both these extractions may be repeated or operated by countercurrent methods so as to effect substantially complete extraction of the styrene.

The solvent used for the second extraction operation may, in general, be any solvent for styrene which is at the same time immiscible with aqueous solutions of silver nitrate, and differs sufficiently in boiling point from styrene to render the recovery of the olefin from the second solution by distillation a comparatively easy operation. The required difference between the boiling point of the solvent and that of the recovered styrene is a function of the efficiency of the distillation equipment available for their separation. Very precise, high efficiency equipment might separate a solvent and solute differing about 10° C. in boiling points. Greater differences are necessary for less efficient equipment, and the range of difference in boiling points when commercial equipment is used should be from 25° C. to 100° C. Preferably the lower boiling solvents are used in order to avoid polymerization.

These solvents must also be sufficiently purified and of such nature as not to contaminate the silver nitrate solution, nor to introduce complications by way of products undesired in admixture with the recovered olefins. As examples of some solvents which may be used, and which have been found satisfactory, chloroform, carbon-tetrachloride, benzol and any of the paraffin hydrocarbon fractions of suitable boiling range may be named.

In continuous commercial operation, the styrene-ethyl benzene fraction may be contacted at atmospheric temperatures and pressures with a saturated solution of silver nitrate. This solution of silver nitrate may be made from the technical reagent, since it has been found that iron, copper, nickel, chromium and similar impurities which may be present in technical silver nitrate, or apt to be introduced into a solution thereof by reaction with the containing equipment, are substantially harmless to the solution operation, even when present in quantities up to about 5% by weight of each of the four mentioned metals, or 20% total impurities. It has been found that silver fluoride is also an effective absorption reagent in aqueous solutions. The contacting of the silver nitrate and liquid hydrocarbon is preferably carried out in a countercurrent contacting apparatus of any of the ordinary forms, such as, for instance, a tower packed with separating devices and the like, advantage being taken of the difference in specific gravities of the two reagents. This contacting operation may be continued until the silver nitrate solution takes up roughly 5% by weight of styrene leaving an ethyl benzene liquid which is 90–100% pure, but the degree of extraction may be varied and is governed by economic considerations rather than chemical. Since this extracted liquid may contain traces of silver nitrate, either dissolved or mechanically admixed in the form of a spray, it is desirable to scrub it with water, thus gradually collecting a valuable reagent which otherwise would be lost. The styrene so dissolved in the silver nitrate is substantially free from ethyl benzene, since it has been found that silver nitrate solution exerts very little solvent power for the latter. The enriched silver nitrate solution may then be contacted in another tower similar in character, with a narrow cut petroleum fraction having the boiling point and the general characteristics of pentane. Liquid butane, pentane, hexane, or their isomers, or any mixture of them, may be used, the characteristic being capability of dissolving styrene, and sufficiently different boiling point from the styrene recovered to permit separation by distillation. Other materials, such as chloroform, carbon-tetrachloride, benzol and others which fulfill the above requirement may be used. Of these, pentane or an equivalent mixture of hydrocarbons is the most conveniently usable. Pentane has a boiling point of 36° C. Styrene has a boiling point of 146° C. at the same pressure, and we find this difference in boiling points sufficiently great to promote easy and complete separation. In general, we may use any water-immiscible, inert (i. e., non-reducing and neutral or slightly acidic) solvent which boils at a temperature of say: 10° C. to 100° C. different from the desired olefin, but this difference may be varied, the choice being dictated solely by distillation conditions. The pentane solvent and the silver nitrate solution are contacted countercurrently under the atmospheric pressure, and at atmospheric temperatures, and this contacting results in the production of a silver nitrate solution practically free from styrene, that is, it is sufficiently freed from styrene so that it may be used again as a solution reagent without impairment of efficiency, and this procedure is preferred. The styrene-pentane mixture is then passed to a distillation system of usual type and design, wherein the styrene is separated from the solvent, the styrene so obtained being of a high degree of purity and the denuded pentane solvent being recirculated to the second extraction step.

It may be seen that this process is entirely continuous in operation, as over and above those operations for the handling of raw material which must be common to all processes, it consists merely of three simple operations, the first of which is liquid to liquid contacting, the second of which is liquid to liquid contacting, and the third of which is a comparatively simple distillation operation. As a further advantage, this process is free from operations wherein construction materials known to react or reduce heated silver nitrate solutions, are exposed to silver nitrate solutions under heat, with resulting loss of silver nitrate. Many of these advantages are inherent in the present invention largely because of the step of extracting the olefins from the silver nitrate solution with a liquid solvent possessing the characteristics or properties described above. Additional advantages of the invention result from the employment of silver-lined vessels or containers for the silver nitrate solution, and in this connection it has been discovered that vessels or containers lined or interiorly coated or plated with a metal which is not more electro-positive than silver are suitable for the invention. Such linings or coatings may consist of silver, gold, platinum, and alloys possessing the general properties of a noble metal. Further advantages are evident from the foregoing description of the invention.

Silver nitrate has been used throughout this specification in solely an exemplary manner, and it is not desired to limit the invention thereby, but to extend it to operation with any of the metallic salts capable of reversible combination with olefins, subject to the limitations of the claims.

We claim:

1. The process of separating a vinyl benzene of the class consisting of styrene and its homologues from mixtures with ethyl benzene which comprises contacting said mixtures with an aqueous solution of a metal salt capable of reversibly combining with styrene, separating the aqueous solution containing the vinyl-benzene-metal complex from the remaining hydrocarbons, contacting said aqueous solution with a volatile solvent for vinyl benzene which is immiscible with water to remove the vinyl-benzene therefrom, and separating said solvent from the vinyl benzene.

2. The process of separating a vinyl benzene of the class consisting of styrene and its homologues from mixtures with ethyl benzene which comprises contacting said mixtures with an aqueous solution of silver nitrate, separating the aqueous solution containing the vinyl-benzene-metal complex from the remaining hydrocarbons, contacting said aqueous solution with a volatile solvent for vinyl benzene which is immiscible with water to remove the vinyl-benzene therefrom, and separating said solvent from the vinyl benzene by distillation.

3. The process of separating a vinyl benzene of the class consisting of styrene and its homologues from mixtures with ethyl benzene which comprises contacting said mixtures with an aqueous solution of a metal salt capable of reversibly combining with styrene, separating the aqueous solution containing the vinyl-benzene-metal complex from the remaining hydrocarbons, contacting said aqueous solution with pentane, separating pentane containing vinyl-benzene from the aqueous solution and separating pentane from the vinyl benzene by distillation.

4. The process of separating a vinyl benzene of the class consisting of styrene and its homologues from mixtures with ethyl benzene which comprises contacting said mixtures with an aqueous solution of silver nitrate, separating the aqueous solution from the remaining hydrocarbons, contacting said aqueous solution with pentane to separate the vinyl-benzene from the aqueous solution and dissolve it in the pentane, followed by separation of the pentane from the aqueous solution and separating pentane from the vinyl benzene by distillation.

ALFRED W. FRANCIS.
EBENEZER E. REID.